Feb. 6, 1962 V. JORNER 3,020,050

SPINDLE FOR AUTOMATIC DROP-TYPE PHONOGRAPHS

Filed July 6, 1959 7 Sheets-Sheet 1

INVENTOR.
VICTOR JORNER
BY Carl V. Lloyd
ATTY.

Feb. 6, 1962 V. JORNER 3,020,050

SPINDLE FOR AUTOMATIC DROP-TYPE PHONOGRAPHS

Filed July 6, 1959 7 Sheets-Sheet 2

INVENTOR.
VICTOR JORNER
BY [signature]
Att'y.

Feb. 6, 1962 V. JORNER 3,020,050

SPINDLE FOR AUTOMATIC DROP-TYPE PHONOGRAPHS

Filed July 6, 1959 7 Sheets-Sheet 3

INVENTOR.
VICTOR JORNER
BY Carl S. Lloyd
Atty.

SPINDLE FOR AUTOMATIC DROP-TYPE PHONOGRAPHS

Filed July 6, 1959 7 Sheets-Sheet 4

INVENTOR.
VICTOR JORNER
BY Carl V. Lloyd
ATTY.

INVENTOR.
VICTOR JORNER
BY Carl V. Lloyd

Feb. 6, 1962 V. JORNER 3,020,050

SPINDLE FOR AUTOMATIC DROP-TYPE PHONOGRAPHS

Filed July 6, 1959 7 Sheets-Sheet 6

INVENTOR.
VICTOR JORNER
BY Carl V. Lloyd
ATT'Y.

INVENTOR.
VICTOR JORNER
BY Carl V. Lloyd
Att'y.

United States Patent Office 3,020,050

Patented Feb. 6, 1962

3,020,050

SPINDLE FOR AUTOMATIC DROP-TYPE PHONOGRAPHS

Victor Jorner, Chicago, Ill., assignor to The Seeburg Corporation, Chicago, Ill., a corporation of Pennsylvania Filed July 6, 1959, Ser. No. 825,291

3 Claims. (Cl. 274—10)

This invention relates generally to automatic phonograph record players and more particularly to a record supporting and changing spindle structure for use in such record players.

More specifically my invention relates to an improved drop-type record supporting and changing spindle which is especially well suited for use in automatic phonographs of the drop-type which are adapted to play both sides of a plurality of records seriatim.

In the drop-type automatic phonographs heretofore known, whether of the type adapted to play both sides of a record or merely one side thereof, the record supporting and changing spindle is provided with a set of primary record supporting means and, in some cases, with a second set of secondary record supporting means or separators. In such phonographs the primary record supporting means are adapted to support a stack of records to be played. If both sides of the records are to be played then the bottom side of the lowermost record in the stack may be reproduced prior to the dropping of that record to a turntable, but in either event when the top side of said record is to be reproduced it will be dropped to a turntable positioned at the bottom of the spindle in order to place said top side in its playing position. Where secondary record supporting means are provided they are adapted to support the stack of remaining records when the lowermost record in said stack is dropped.

It will be understood that in the phonographs heretofore known of the type described above the turntable supports the entire stack of records which have been reproduced, and the record which is having its top side reproduced is the uppermost record in said stack. Thus each time a new record is dropped to the turntable to be reproduced it assumes a playing position different from that assumed by the record previously played, i.e., it is elevated a distance equal to the thickness of a record.

It is well known that the reproduction of a disc type record requires the use of a tone arm having a cartridge with a stylus mounted thereon, and that said tone arm must function in cooperative relation with the record being reproduced. Because in the phonographs heretofore known each record assumes a different playing position, the tone arm which is pivotally mounted must function in a plurality of such playing positions. In other words the tone arm and stylus must be able to cooperate with the record which immediately surmounts the turntable as well as the last record to be played, which would be the uppermost one of a plurality of records stacked upon said turntable.

In the usual case the tone arm is tilted downwardly at a considerable angle from the horizontal in order to reproduce the top side of the first record dropped to the turntable, and as successive records are dropped and played the playing position of said tone arm gradually approaches a horizontal position. When the playing position of the tone arm is approximately horizontal it will have reached the upper limit of its operative range and the records which have been played must then be removed from the turntable before further operation of the phonograph is possible.

It will now be understood that one disadvantage of the drop-type phonographs heretofore known is that the number of records which can be reproduced automatically in one continuous cycle is severely limited because of the limited operative range of the tone arm, i.e., because of its ability to assume only a very limited number of different playing positions.

The above-mentioned disadvantage is indeed quite serious because in order to obtain optimum sound reproduction it is important that the playing position of the tone arm always be approximately horizontal, and it is obviously impossible to satisfy this important requirement and still construct a drop-type phonograph of the type heretofore known which will reproduce an appreciable number of records automatically in one continuous cycle. Some of the reasons why optimum sound reproduction can be obtained only when the tone arm is in an approximately horizontal playing position will now be discussed briefly so as to emphasize the importance of this factor.

During the reproduction of a recording a frictional force is produced on the stylus through its contact with a record groove and this force acts in the direction of record rotation at a tangent to said record groove. Since the tone arm is not normally parallel to this tangent said force will result in a torque which tends to rotate the tone arm about its vertical axis and thus cause it to skip over some of the record grooves. The magnitude of this torque is proportional to the effective length of the tone arm (the projected length on a horizontal plane) and this effective length depends, of course, upon the angle which the tone arm makes with the horizontal. While there are means of compensating for the above-mentioned frictional force yet such means can be effective only to the extent said force is constant. Thus if the angle which the tone arm makes with the horizontal varies appreciably during the reproduction of a plurality of records, as is the case with the drop-type phonographs heretofore known, the torque produced by said frictional force will not remain approximately constant and the means for compensating for said torque will not be effective.

A further reason for the importance of always maintaining the tone arm in an approximately horizontal playing position is because optimum sound reproduction can be obtained only when the tone arm is maintained approximately parallel to a tangent to the record groove at the point of stylus contact. It is well known that due to the modulation of the groove it "wiggles" from one side to the other, and if the stylus is to follow such modulation it must be able to move sideways in a path perpendicular to said tangent. This, of course, can be effectively accomplished only when the tone arm is parallel to the above-mentioned tangent. Because the tone arm is continuously rotating about a vertical axis (in a drop-type phonograph) there is only one point at which it will be perfectly parallel to a tangent to the record groove at the point of stylus contact, but the longer the effective length of said tone arm the more closely will the tone arm approach this optimum parallel position throughout the reproduction of a recording. As noted previously, a tone arm which is approximately horizontal has a greater effective length and thus a horizontal tone arm can better follow the modulation in a monaural recording. Another way of expressing this conclusion is to state that with a horizontally positioned tone arm there is less lateral tracking error.

When stereophonic recordings are used it is especially advantageous to maintain the tone arm in an approximately horizontal playing position since it is well known that the modulation in the grooves of a stereophonic record is such that said grooves not only "wiggle" sideways but they constantly vary in depth. Simple geometric considerations will readily indicate that the stylus will be able to move in a vertical direction (perpendicular to the record), so as to follow said depth variations accurately, only if the tone arm is horizontal. Thus with a horizontally positioned tone arm vertical tracking error is appreciably reduced.

With respect to stylus and record wear it should be noted that when the playing position of the tone arm varies considerably from the horizontal so that lateral or vertical tracking error or both are thereby increased, not only does this increase the distortion in the sound reproduction, but it also increases wear on the stylus and on the records.

A further consideration is that when the tone arm is tilted appreciably from the horizontal, the stylus must be positioned very close to the end of said tone arm in order that said stylus itself and not the end of the tone arm will contact the record and, of course, this problem is avoided where the tone arm is maintained in an approximately horizontal position.

In addition to the fact that the drop-type phonographs heretofore known can accommodate only a very limited number of records and cannot produce optimum sound reproduction because of the variable playing positions which their tone arms must assume, it should also be noted that when the top side of a record is being reproduced it normally rests upon a plurality of records supported by a rotating turntable, and is rotated only by the frictional forces developed between said records. Whenever the records become slightly warped, slippage will occur and such slippage impairs sound reproduction. While some attempts have been made to solve this problem yet none have been particularly successful, and in most drop-type phonographs presently on the market only friction between the records is relied upon for rotation of the record being reproduced.

One object of this invention is, therefore, to provide a record supporting and changing spindle to be used in conjunction with automatic drop-type phonographs whereby a large number of records can be accommodated in one continuous cycle.

Another object of the invention is to provide a record supporting and changing spindle for use with automatic drop-type phonographs which will maintain any record which is having its top side reproduced in one particular playing position, and which will thus maintain the same playing position for each of a plurality of records.

A further object of the invention is to provide such a spindle which will maintain but one playing position for any record having its top side reproduced, which position is so situated with respect to the tone arm of said phonograph that said tone arm need not be tilted appreciably from the horizontal during the reproduction of any one of a plurality of such records.

Still another of my objects is to provide such a spindle which will positively grip that record which is having its top side reproduced and maintain it out of contact with any other record previously played or to be played.

An additional object of the invention is to provide a record supporting and changing spindle for use with automatic drop-type phonographs of the type embodying a single tone arm with an upper and lower stylus and adapted to play both sides of a plurality of records seriatim, which spindle will maintain any record having its bottom side reproduced in one particular playing position and any record having its top side reproduced in a second particular playing position, both of said playing positions being so arranged with respect to said tone arm that said tone arm need not be tilted appreciably from the horizontal during the reproduction of both sides of a plurality of records.

Other objects and advantages of the invention will be apparent from the following description of a preferred embodiment thereof, taken in conjunction with the accompanying drawings, in which.

Figures 6, 7, 18:
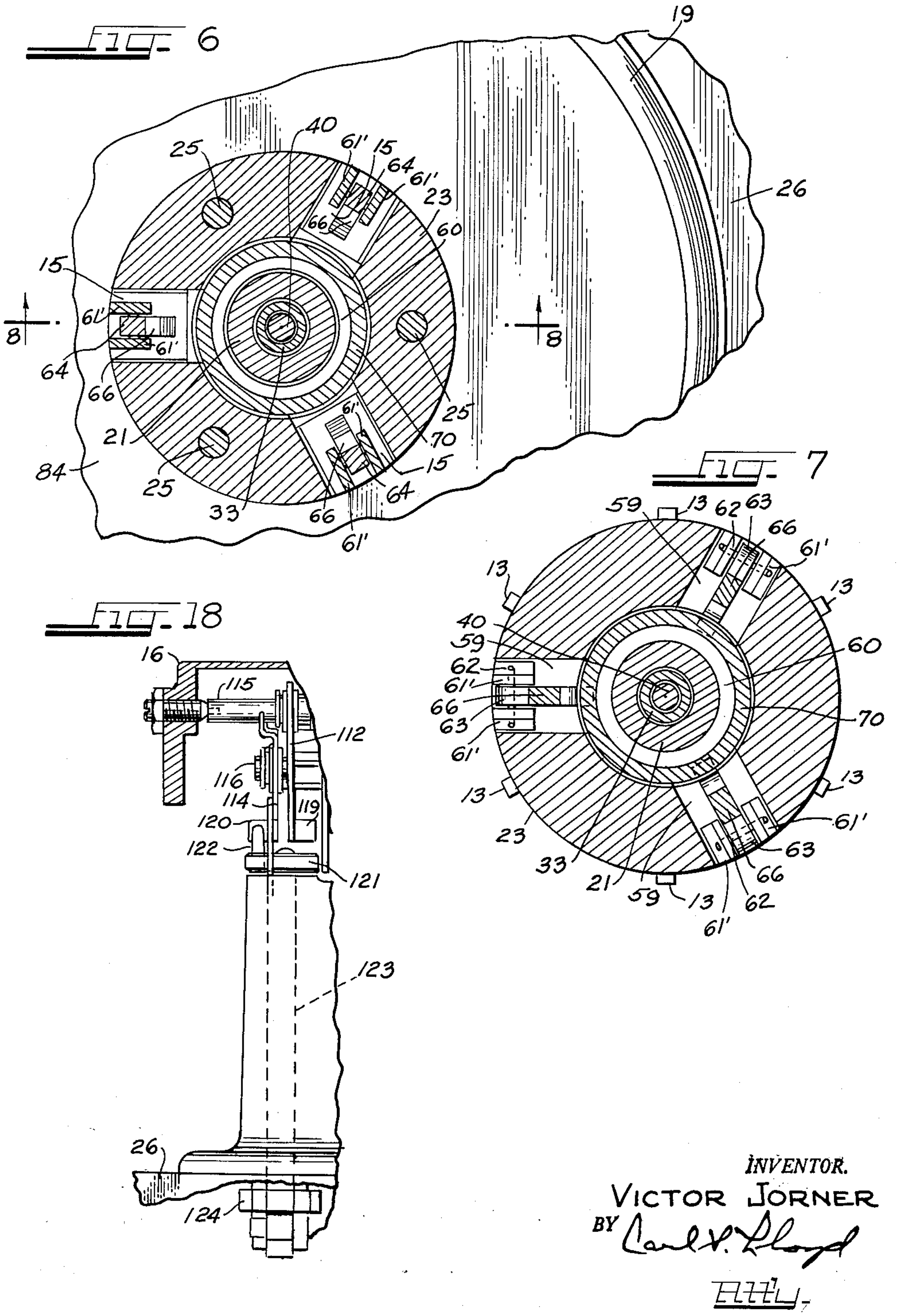
FIG. 6 is an enlarged sectional view of the spindle, partly broken away, taken substantially along the line 6—6 of FIGS. 2 and 9, illustrating in particular three lower record holders.
FIG. 7 is an enlarged sectional view of the spindle, taken substantially along the line 7—7 of FIGS. 2 and 9, illustrating in particular three bell cranks for actuating said lower record holders.
Figure 17:
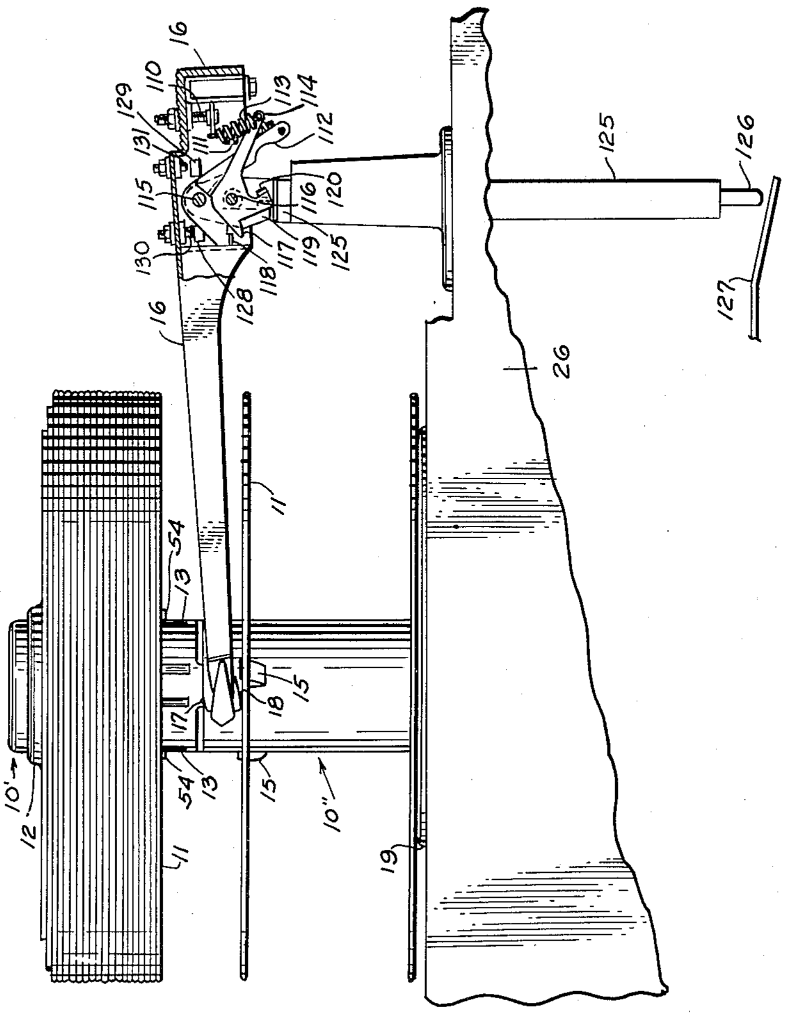

FIG. 17 is a reduced side elevational view, partly in section, showing the spindle of my invention, with a plurality of records mounted thereon, in conjunction with a tone arm adapted to assume either of two playing positions for playing both sides of a plurality of records; and FIG. 18 is an end elevational view, partly in section and partly broken away, illustrating a portion of the mechanism for moving said tone arm into either of said two playing positions.

Before describing the preferred embodiment of my spindle in detail it may be well to describe generally its operation and the manner in which it cooperates with the other major components of a drop-type phonograph. While in the present embodiment my spindle is shown as being of the type having a large diameter, such as is commonly used for accommodating records adapted to rotate at substantially 45 r.p.m., yet it should be understood that my invention is not limited thereto but may be constructed in other embodiments to accommodate records having small central apertures. Furthermore, my invention may be used in phonographs of the type adapted to play only one side af a plurality of records or in phonographs adapted to play both sides thereof, but because it is particularly advantageous when used in conjunction with the latter its operation in that type will be described.

Figure 1:
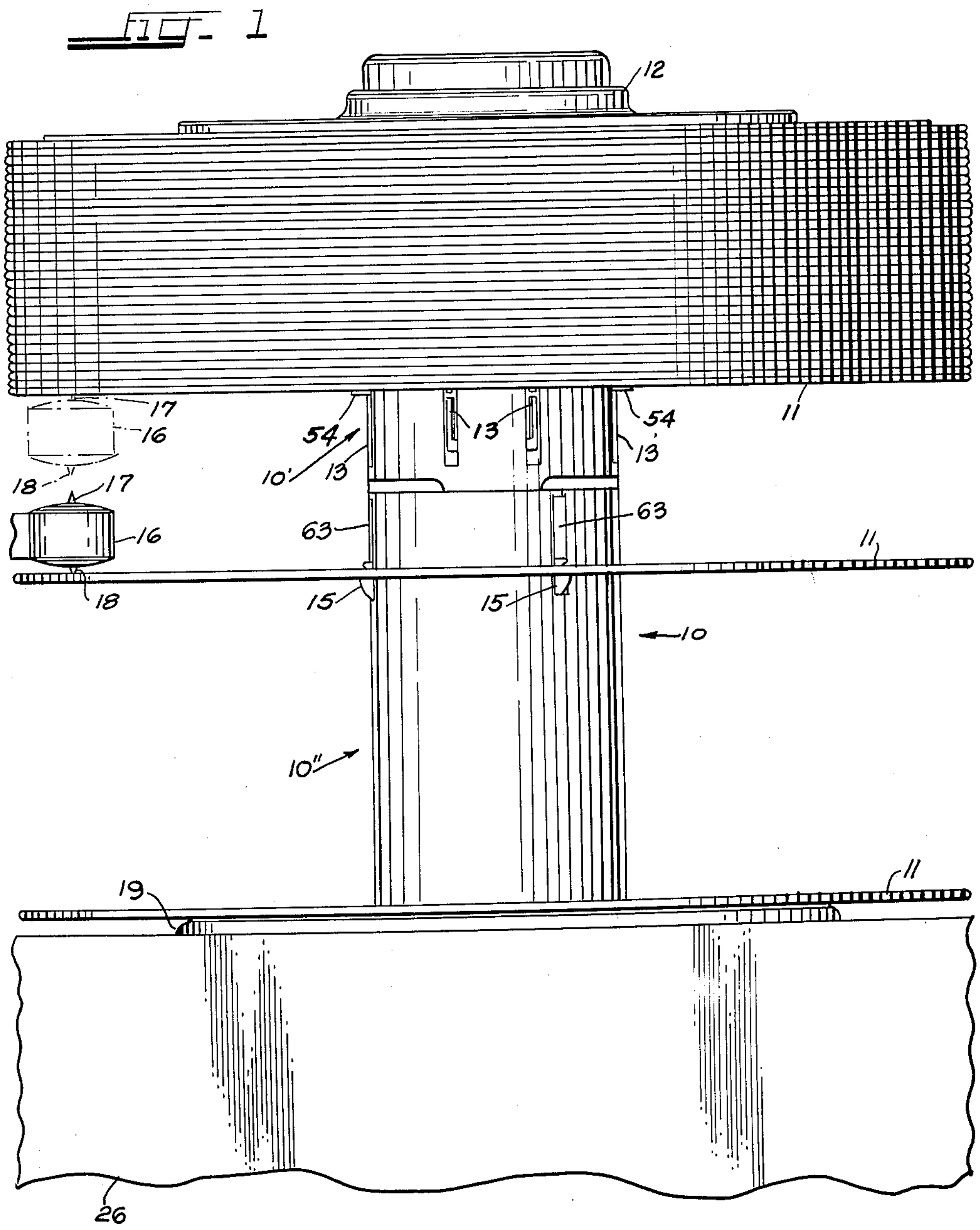
FIG. 1 is a side elevational view showing one embodiment of the spindle of my invention with a plurality of records mounted thereon.

Referring first to FIG. 1, my record supporting and changing spindle is shown generally at 10 with a plurality of records 11 mounted thereon. A record retaining member 12 is slidably mounted upon the upper end of the spindle 10 and serves to stabilize the stack of records 11. The spindle 10 has six upper record supports 13, six record separators 14 and three lower record supports 15 mounted therein (see FIGS. 8 and 9).

Figure 9:
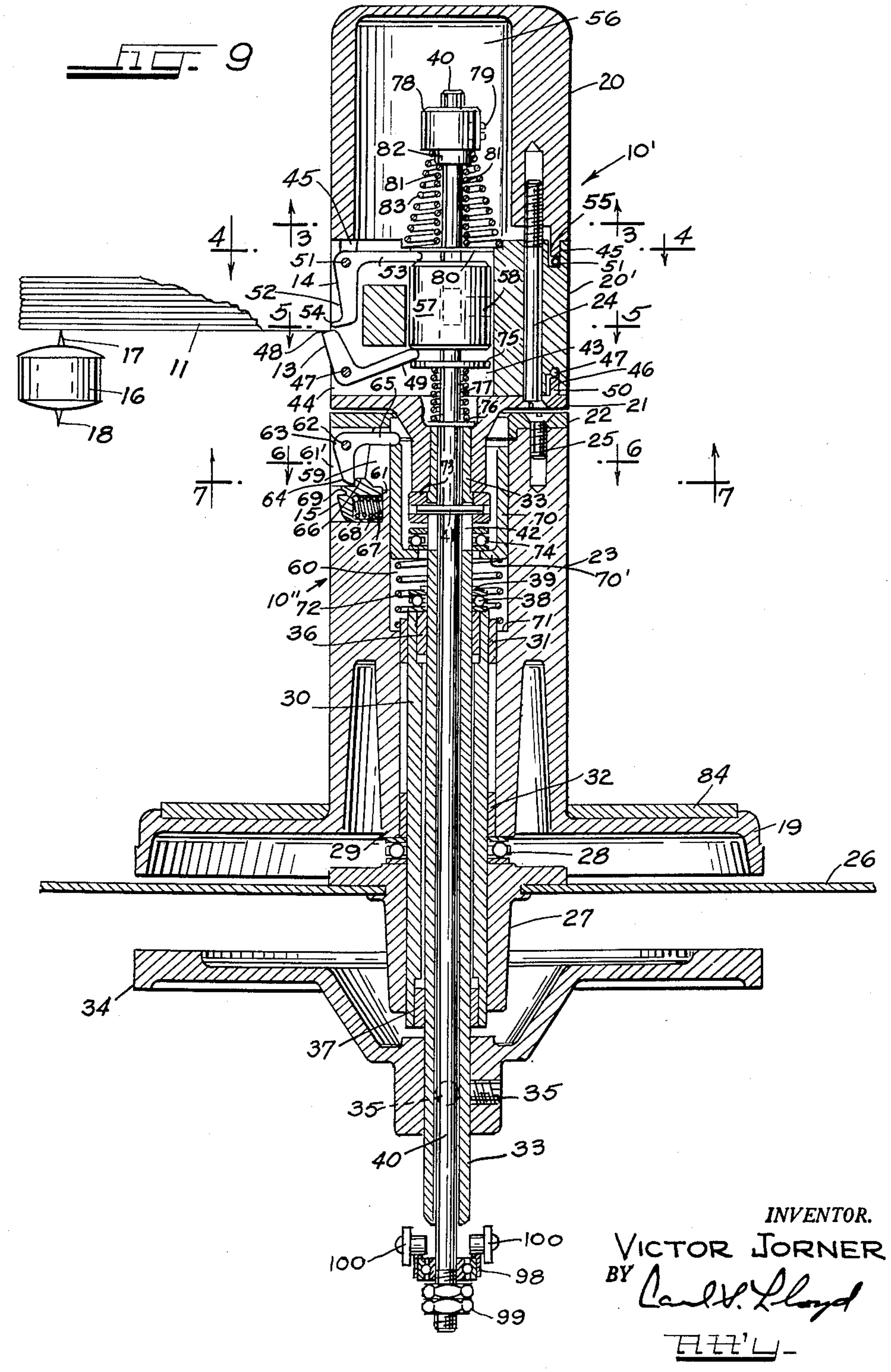
FIG. 9 is a side elevational and irregular sectional view of the spindle, taken along the same section lines as FIG. 8, showing a plurality of records mounted upon the upper record supports.

Reference is next made to FIG. 9 which shows the various elements of the spindle 10 in their normal or at rest position. The record separators 14 and the lower record supports 15 are biased to their inwardly directed inoperative positions and the upper record supports 13 are biased to their outwardly directed operative positions. The records to be played are placed on the top of the spindle 10 until the inner peripheral portion of the lowermost record of the stack comes to rest upon the six upper record supports 13. When all of the records to be played have been mounted upon the spindle 10 in this manner the record retaining member 12 may be slidably mounted over said records so as to stabilize them (see FIG. 1).

Still referring to FIG. 9, the phonograph embodying my invention is then set in operation and a tone arm 16, having an upper stylus 17 and a lower stylus 18 mounted thereon, is brought into operative relation with the bottom side of the lowermost record in the stack so as to reproduce the recording thereon. When the reproduction of this recording is completed the tone arm 16 is moved out from beneath the stack of records 11. The upper record holders 13 are then moved to their inwardly directed inoperative positions and the record separators 14 and the lower record holders 15 are moved to their outwardly directed operative positions. The record separators 14 engage the inner peripheral portion of the next-to-lowermost record when moved outwardly and they thus support the entire stack of records except for the lowermost record which is dropped downward on the spindle 10 until it comes to rest upon and is gripped by the lower record holders 15.

The lowermost record which has been dropped as described above thus assumes a second playing position (see FIG. 1), and the tone arm 16 is then brought into operative relation with the top side of said record so as to reproduce the recording thereon. The upper stylus 17 is used for reproducing the bottom side of a record and the lower stylus 18 is used for reproducing the top side thereof. When this recording has been reproduced, the tone arm is again moved out from beneath the stack of records and the record holders 13 and 15 and record separators 14 are again moved to the position shown in FIG. 9. In other words, the upper record holders 13 are moved to their outwardly directed operative position and the record separators 14 are moved to their inwardly directed inoperative position in such a manner that the entire stack of records 11 is dropped a short distance, approximately equal to the thickness of a single record, so as to rest upon the upper record holders 13, and the lower record holders 15 are moved to their inwardly directed inoperative position so as to drop that record which has had its top and bottom sides reproduced to the turntable 19.

The cycle described above is continuously repeated until both sides of every record in the stack have been played and the entire stack of records 11 rests upon the turntable 19. The retaining member 12 is then removed from the spindle 10 and the entire stack of records may be removed by sliding them upwardly over the upper end of said spindle.

It will now be understood that when a phonograph of the type adapted to play both sides of a plurality of records embodies the spindle of my invention, the tone arm 16 need occupy only two different playing positions, and in either of said positions the tone arm need be tilted only slightly from the horizontal in order to reproduce any recording. Thus when the bottom side of a record is being reproduced that end of the tone arm which mounts the stylus will be in the dotted-line position shown in FIG. 1, and when the top side of a record is being reproduced it will be in the solid-line position there shown.

It will be noted that the turntable 19 is used only to support those records which have already been played and no record is played while it rests upon said turntable, as is done with phonographs employing spindles of the type heretofore known.

If it is desired to utilize my spindle in conjunction with a drop-type phonograph of the type adapted to play only one side of a plurality of records, then it is simply necessary to actuate the upper and lower record holders 13 and 15 and the record separators 14 two times whenever the reproduction of the top side of a record has been completed. Thus the records would be in the position shown in FIG. 8 during the reproduction of the top side of the record supported by the lower record holders 15. When that recording had been played the record separators 14 and the lower record holders 15 would be moved to their inwardly directed positions and the upper record holders 13 would be moved to their outwardly directed positions. In this manner the record which was played would be dropped to the turntable 19 and the remaining stack of records would rest upon the upper record holders 13. Then the members 14 and 15 would again be moved outwardly and the members 13 moved inwardly in such manner that the next record to be played would be dropped to the holders 15 in which position its top side would be reproduced, and the remaining records would be supported by the record separators 14.

Therefore, while my invention is particularly advantageous for use in phonographs of the type adapted to play both sides of a record, and it will be described hereinafter in detail for such use, yet even when used with photographs adapted to play but one side of a record it effects important advantages not found in the spindles heretofore known.

Figure 2:
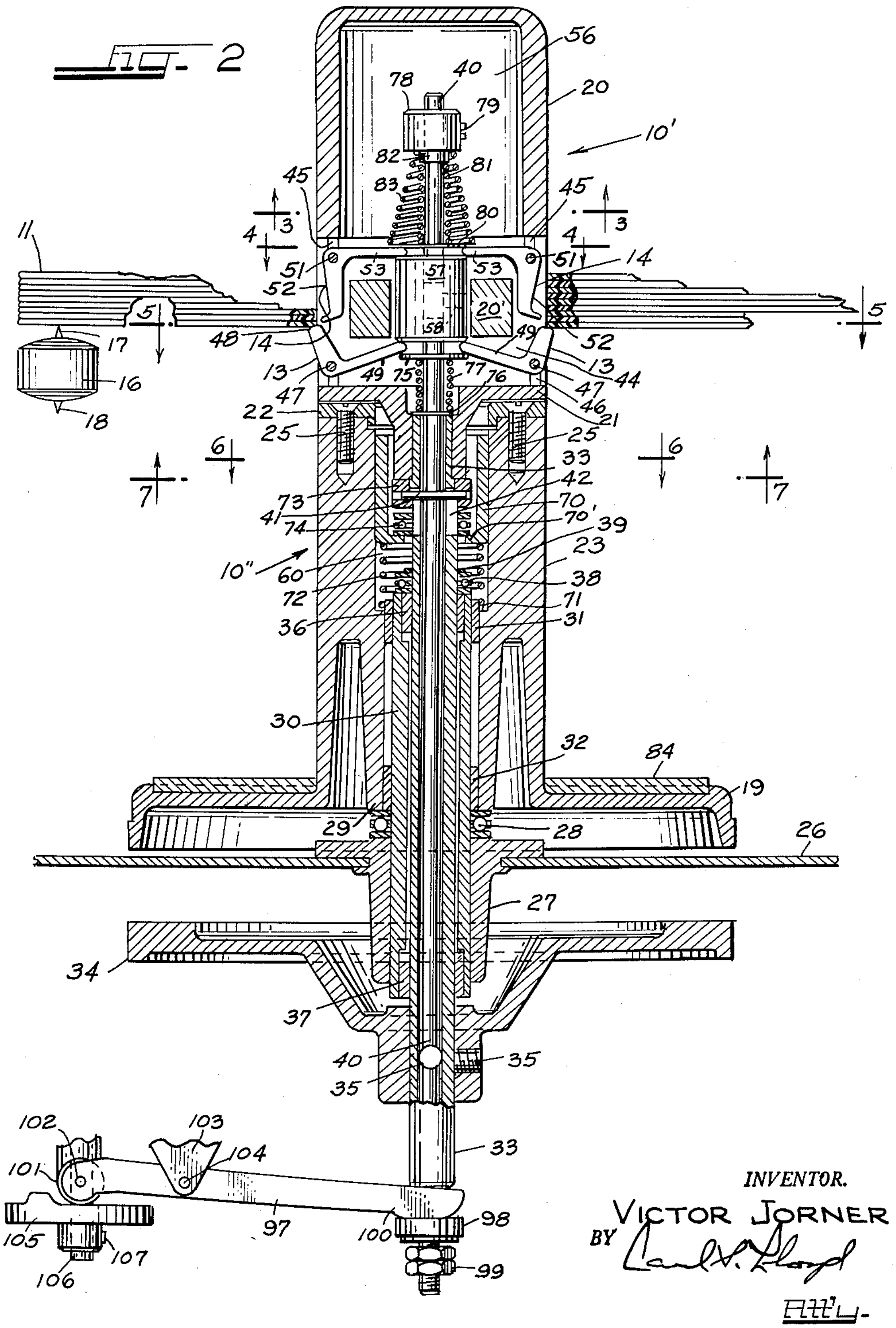
FIG. 2 is a side elevational view, predominantly in section, of the spindle of FIG. 1 illustrating, in positions different from those shown in FIG. 1, the upper record holder elements and the record separator elements, and further illustrating the means for actuating said elements from one position to another.

Having described my invention in a general way I will now describe in detail a preferred embodiment of my record supporting and changing spindle and for this purpose reference is made to FIGS. 2 and 9. While the entire structure shown in FIGS. 2 and 9 may be referred to generally as the spindle structure, yet for present purposes the section 20 will be referred to as the upper spindle top, the section 20′ as the upper spindle middle and the section 21 as the upper spindle bottom, the upper spindle being indicated generally at 10′. In a similar manner the section 22 will be referred to as the lower spindle top and the section 23 (which is shown as being integral with the turntable 19) as the lower spindle bottom, the lower spindle being indicated generally at 10″. Since the embodiment now being described is for use with phonographs of the type adapted to play both sides of a record, the upper spindle sections 20, 20′ and 21 are arranged for rotation as a unit in one direction while the lower spindle sections 22 and 23 are arranged for rotation as a unit in the opposite direction, as will be more fully explained hereinafter.

Each of the five spindle sections referred to above are of equal diameter and in the present embodiment said diameter is only slightly less than that of the relatively large central aperture of the well-known 45 r.p.m. record discs so as to permit free axial movement of such records thereon.

The upper spindle top 20, the upper spindle middle 20' and the upper spindle bottom 21 are anchored together in axial alignment by a pair of anchoring screws 24 (shown best in FIGS. 8 and 9) which extend upwardly through suitably aligned apertures in the sections 21 and 20' and are threaded into the upper spindle top 20. The lower spindle top 22 and the lower spindle bottom 23 are also anchored together by three anchoring screws 25 which extend downwardly through apertures in the member 22 and are threaded into the member 23.

A housing 26 (which is shown broken away in FIGS. 2 and 9) is provided to enclose those portions of the spindle 10 which are situated below the turntable 19, as well as various other elements of the phonograph of which said spindle 10 forms a part. A stationary sleeve member 27 is fixedly mounted to the top of the housing 26 and a thrust bearing 28 is mounted between said sleeve 27 and the annular rim 29 of the lower spindle bottom 23 through which said member 23 is supported. Thus the lower spindle 10'' comprising the members 22 and 23 and the turntable 19 are rotatably mounted upon the bearing 28. Said lower spindle 10'' may be rotated by means of a rubber drive roller or the like positioned for contact with the turntable 19 at a point on its outer periphery, as will be more fully explained hereinafter.

A stationary spindle sleeve 30 is fixedly mounted within the fixed sleeve member 27. The spindle sleeve 30 may simply be pressed into the member 27 or the latter may be die cast around said spindle sleeve. Two lower spindle bearings 31 and 32 are provided between the spindle sleeve 30 and the lower spindle bottom 23. The lower spindle 10'' is thus supported vertically by the thrust bearing 28 and laterally by the bearings 31 and 32.

Referring next to the upper spindle 10' comprising sections 20, 20' and 21, it will be noted that a spindle shaft 33 (which extends downwardly beyond the lower end of the sleeve member 27) is tightly pressed within the upper spindle bottom 21 in such manner that rotation of said spindle shaft 33 will effect rotation of the upper spindle 10'. In other words, rotation of the spindle shaft 33 will effect rotation as a unit of the members 20, 20' and 21 which are anchored together to form the upper spindle 10' as previously described. At the lower end of the spindle shaft 33 there is a flywheel 34, which has an outside diameter equal to that of the turntable 19, fixedly mounted thereon by a pair of set screws 35 in such a manner that rotation of the flywheel 34 will effect rotation of said spindle shaft 33, and thus of the entire upper spindle 10'. It will now be understood that said upper spindle 10' may be rotated by means of a rubber drive roller or the like positioned for contact with the flywheel 34 at a point on its outer periphery as will be more fully explained hereinafter.

Two spindle shaft bearings 36 and 37 are provided between the fixed spindle sleeve 30 and the spindle shaft 33 to provide lateral support for said spindle shaft. A thrust bearing 38 surmounts the upper end of the spindle sleeve 30 and the spindle shaft 33 is mounted for rotation upon said bearing 38 by means of a retainer ring 39 which fits within an annular groove in said spindle shaft 33 and rests upon said thrust bearing 38.

An operating shaft 40 is slidably mounted within the spindle shaft 33 and is pinned thereto by the pin 41 in such manner that when the spindle shaft 33 and the upper spindle 10' are rotated, the operating shaft will be rotated therewith. The pin 41 is fixedly mounted in the operating shaft 40 but it passes through vertical slots 42 in the spindle shaft 33 in such manner that relative vertical movement of the operating shaft 40 with respect to the spindle shaft 33 is permitted, but relative rotation between said members is not permitted. The purpose of this arrangement is to permit vertical movement of the operating shaft 40 for actuation of the record holders 13 and 15 and record separators 14, as will be more fully explained hereinafter.

Referring now to FIGS. 2, 4, 5 and 9, the upper spindle middle 20' is provided wtih an axial passage 43 and six circumferentially spaced radial slots 44 that extend axially the full length of the member 20'. The slots 44 extend radially outwardly through the outer peripheral wall surface of the member 20'. Adjacent to the upper and lower ends of said member 20', the slots 44 extend radially inwardly through the inner peripheral wall surface of said member so as to communicate wtih the axial passage 43 at said upper and lower ends of the upper spindle middle 20'. However, these slots are relatively shallow at the axially intermediate portion of the member 20' and in this portion they do not communicate with said axial passage. The member 20' also has an annular slot 45 formed in its upper end (see FIG. 4) and a similar slot 46 formed at its lower end.

Seated in the lower annular slot 46 is an annular shaft or mounting ring 47 which extends through suitable apertures in the six upper record holders 13. The upper record holders 13 are each carried in a different one of the slots 44, and each of said holders includes a generally upwardly extending arm, the upper end of which defines a record engaging shelf or shoulder 48, and a generally radially inwardly extending arm 49 the radially inner end of which extends into the axial passage 43 of the upper spindle middle 20'. The upper spindle bottom 21 is provided with a pluraltiy of axially upwardly extending segmental tongues 50 which are received within the annular slot 46 and engage the annular mounting shaft 47 so as to hold the same seated in said slot. The upper record holders 13 are freely movable on the annular shaft 47 for pivotal movement between operative and inoperative positions as will be more fully described hereinafter.

In a similar manner the six record separators 14 are mounted respectively in the upper ends of the slots 44. Thus in the upper annular slot 45 of the upper spindle middle 20' there is mounted an annular shaft or ring 51 which extends through suitable apertures in the six record separators 14. The record separators 14 are each carried in a different one of the slots 44 adjacent to the upper end thereof, and each comprises a generally downwardly extending arm 52 and a generally radially inwardly extending arm 53. The record separators 14 are freely movable on the mounting shaft 51 for pivotal movements between operative and inoperative positions, and the radially inner ends of the arms 53 extend into the central passage 43 of the upper spindle middle 20' in a manner similar to the ends 49 of the upper record holders 13.

The lower ends of the arms 52 on the record separators 14 are provided with outwardly extending relatively sharp edged record separating and supporting portions 54 which are adapted to move between the lowermost record of a stack being supported by the shoulders 48 on the upper record holders 13 and the next-to-lowermost record, when said separators 14 are moved to their operative positions. The upper spindle top 20 is provided with a plurality of segmental tongues 55 which extends axially downwardly into the annular slot 45 in the member 20' and serve to hold the annular shaft 51 seated in said slot. The upper spindle top 20 is also provided with an axial passage 56 (see FIG. 3).

A cylindrical operating element or head 57 is mounted in the axial passage 43 of the member 20' for axial sliding movement therein and said head 57 is mounted between the radially inner ends of the arms 49 which underlie the lower end thereof and the radially inner ends of the arms 53 which overlie the upper end thereof. The operating head 57 is fixedly mounted to the operating shaft 40 by means of a set screw 58. The upper portion of the operating shaft 40 extends above the head 57 and into the passage 56 of the upper spindle top 20 and, as previously described, the lower end thereof is slidably mounted within the spindle shaft 33 which serves as a guide for said operating shaft. The lower end of the operating shaft 40 extends downwardly into the interior of the housing 26 and the shaft 40 is actuated by mechanism contained within said housing as will be more fully explained hereinafter.

Referring next to FIGS. 2, 6, 7 and 9, at the extreme upper end of the lower spindle bottom 23 there are provided three circumferentially spaced slots 59 which extend radially outwardly through the outer surface of the member 23. The axially upper portions of said slots 59 extend radially inwardly so as to communicate with an axial passage 60 in the member 23 while the lower portions of said slots 59 are of a lesser depth so as to provide a wall 61 between said slots and said passage 60.

Figure 10:
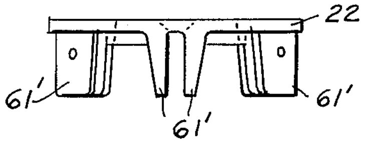
FIG. 10 is a side elevational detail view of the lower spindle top.
Figure 11:
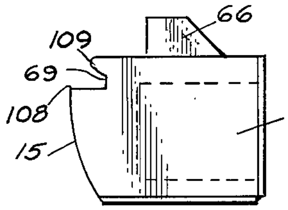
FIG. 11 is an enlarged side elevational view of a lower record support.
Figure 12:
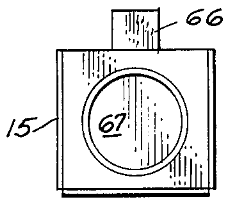
FIG. 12 is an enlarged end elevational view of a lower record support.

The lower spindle top 22 (see FIGS. 6, 7, 9 and 10) is provided with three pairs of downwardly extending mounting tongues 61′ (shown best in FIG. 10), and three individual shafts 62 are mounted respectively in each pair of said tongues by means of suitable apertures provided in the latter. Each such shaft 62 pivotally supports a bell crank 63 which has an axially downwardly extending arm 64 and a radially inwardly extending arm 65. The three lower record holders 15 (shown best in FIGS. 11 and 12) are seated at the bottoms of the three slots 59, respectively, and said record holders 15 are so disposed that the lower ends of the arms 64 engage the projections 66 at the top of said record holders. In this manner the position of the bell cranks 63 on their shafts 62 determines the permissible movement of the record holders 15 in a radially outward direction.

Figures 3, 4, 5, 8:
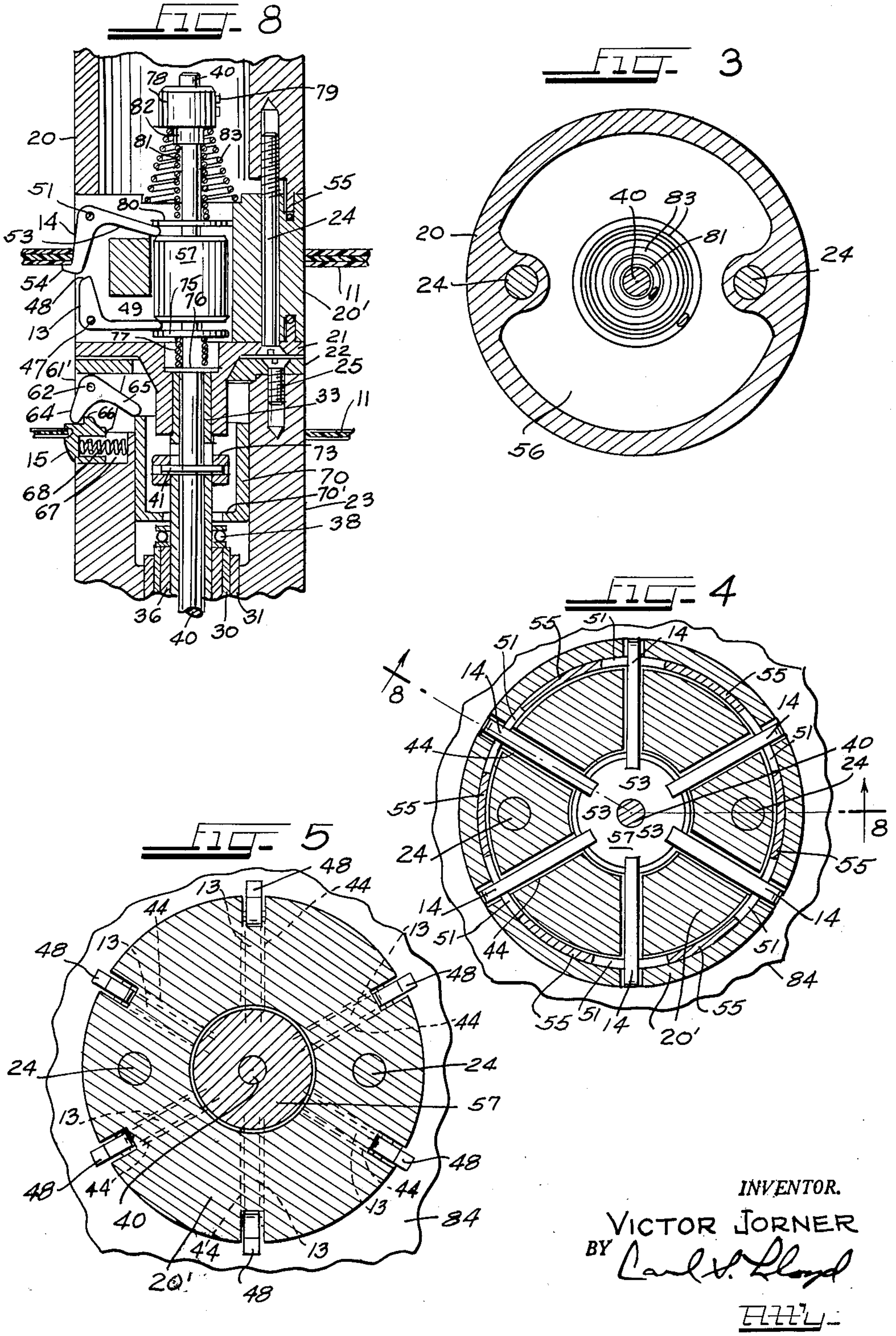
FIG. 3 is an enlarged sectional view of said spindle taken substantially along the line 3—3 of FIGS. 2 and 9.
FIG. 4 is an enlarged sectional view of the spindle, partly broken away, taken substantially along the line 4—4 of FIGS. 2 and 9, illustrating in particular six record separators mounted upon an annular shaft in the upper spindle middle section.
FIG. 5 is an enlarged sectional view of the spindle, partly broken away, taken substantially along the line 5—5 of FIGS. 2 and 9, illustrating in particular six upper record supports mounted upon an annular shaft in the upper spindle middle section.
FIG. 8 is a side elevational and irregular sectional view of the spindle, shown partly broken away and with certain parts omitted, the section of the upper spindle being taken substantially along the line 8—8 of FIG. 4, and the section of the lower spindle being taken substantially along the line 8—8 of FIG. 6.

Each of the three lower record holders 15 is provided with an axial passage 67 and in each such passage there is provided a compression spring 68 which biases the corresponding record holder 15 in a radially outwardly direction, but as previously described the permissible outward movement of the record holders 15 depends upon the position of the bell cranks 63. Each lower record holder 15 is also provided with a groove 69 and when a record 11 is having its top side reproduced in the inner peripheral surface of said record will be engaged by the inner edge of the groove 69 (as shown in FIG. 8) on each of the three lower record holders 15, as will be more fully explained hereinafter.

A tubular member 70 (shown best in FIG. 9), having a reduced diameter at its extreme lower end, is slidably mounted inside the axial passage 60 of the lower spindle bottom 23 for axial movement therein. The upper end of the tubular member 70 is disposed immediately beneath the arms 65 of the bell cranks 63 in such manner that a raising or lowering of the member 70 will cause the bell cranks 63 to pivot about their respective shafts 62.

An annular ledge 71 is provided in the axial passage 60 at a point adjacent to the bearing 31, and a coil compression spring 72 is mounted between said ledge 71 and the lower end of the tubular member 70 so as to bias the latter in an upward direction. It will be seen that the compression spring 72 tends to bias the arms 64 of the bell cranks 63 and the lower record holders 15 in a radially inwardly direction when the operating shaft 40 is in its upward position as shown in FIG. 9.

An operating shaft collar 73 is fixedly mounted to the operating shaft 40 by the pin 41 and said collar 73 limits the upward movement of the shaft 40 within the spindle shaft 33. In other words, when the operating shaft 40 is moved upwardly within the shaft 33 to the position where the collar 73 contacts the lower end of the upper spindle bottom 21, then further upward movement of said shaft 40 is prevented. A thrust bearing 74 is provided between the bottom of the collar 73 and a flange 70′ provided at the lower end of the tubular member 70. When the operating shaft 40 is moved downwardly (by means to be described hereinafter) it carries with it the collar 73, the bearing 74 and the tubular member 70, thus permitting the lower record holders 15 to be moved radially outwardly by their corresponding compression springs 68.

Referring now to FIG. 8 it will be seen that a downward movement of the operating shaft 40 and the operating head 57 causes the upper record holders 13 to be positively moved toward their inoperative record releasing position radially inwardly with respect to the outer peripheral surface of the upper spindle middle 20′. The inner ends of the arms 49 on said record holders 13 are interposed between the lower end of the operating head 57 and a washer 75 which is slidably mounted on the shaft 40. There is also a washer 76 mounted on the shaft 40 which washer rests upon the upper end of the spindle shaft 33. A coil compression spring 77 is positioned between the washer 75 and the washer 76 to yieldingly maintain the upper record holders 13 in their operative record supporting positions when the operating shaft 40 is in its upward position as shown in FIGS. 2 and 9.

Referring again to FIGS. 2 and 9 it can be seen that an upward movement of the operating shaft 40 and the operating head 57 causes the record separators 14 to be positively moved towards their inoperative record releasing positions radially inwardly with respect to the outer peripheral surface of the upper spindle middle 20′. At the top of the operating shaft 40 a stop collar 78 is fixedly mounted thereon by a set screw 79. The inner ends of the arms 53 on the record separators 14 are interposed between the upper end of the operating head 57 and a washer 80 which is slidably mounted on the shaft 40. A coil compression spring 81 is positioned on the operating shaft 40 between the washer 80 and a spacer 82 which is mounted on said shaft immediately beneath the stop collar 78. The compression spring 81 thus serves to yieldingly maintain the record separators 14 in their operative record engaging positions when the operating shaft 40 is in its downward position as shown in FIG. 8.

When the spindle 10 is not in operation it is desirable that the record holders 13 and 15 and the record separators 14 be in the respective positions shown in FIG. 9. For this purpose a conical coil compression spring 83 is provided between the stop collar 78 and the upper end of the upper spindle middle 20′. The conical spring 83 acts independently of the spring 81 and serves to bias the operating shaft 40 in its upward position.

When all of the records 11 have been reproduced they are stacked upon a rubber padding 84 which surmounts the turntable 19 and because the record holders 13 and 15 and record separators 14 will be held in the positions shown in FIG. 9 by the spring 83, said records may be manually lifted from the turntable and off of the spindle 10. During such removal the inner peripheral surfaces of the records will engage the outer edges of the arms 48 on the record holders 13 but said arms will be moved inwardly against the bias of the spring 77 so as to permit the records to pass over them. If desired, an automatic mechanism may be employed for lifting the stack of records from the turntable 19 and restacking them on the upper record holders 13. Such a mechanism is described in Ristau et al., 2,546,136, and in Ristau et al., 2,685,447.

The tone arm 16 (see FIGS. 17 and 18) may be any one of a number of known types and thus its construction will not be fully described in detail herein. It will be noted, however, that in the present embodiment it has upper and lower styli 17 and 18 mounted thereon for cooperation with the bottom side of a record supported by the upper record holders 13 and the top side of a record supported by the lower record holders 15, respectively.

Referring to FIG. 17, an anchoring screw 110 is mounted at the rear end of the tone arm 16. A tension spring 111 has one end fastened to said screw and its other end fastened to a pivoted lever 112 and a second tension spring 113 has one end connected to said screw and its other end connected to a second pivoted lever 114. The tone arm 16 and the lever 112 are rotatably mounted upon a pin 115 while the lever 114 is rotatably mounted upon a pin 116.

Still referring to FIG. 17, the lever 112 is shown in its normal operative position with the spring 111 in tension and exerting a downward force upon the screw 110. The tone arm 16 is so balanced upon its pivot 115 that when the spring 111 is in tension and the spring 113 is not in tension (as shown in FIG. 17), then the lower stylus 18 will bear down upon the top side of a record 11 which is supported by the lower record holders 15 with the proper amount of force for effecting the reproduction of the recording thereon. When the bottom side of a record 11 which is supported on the upper record holders 13 is to be reproduced, the lever 114 is rotated in a clockwise direction until the latch 117 thereon is disposed above and supported by a locking arm 118 on the lever 112. In this manner the lever 114 is locked in the position to which it is rotated and the spring 113 is put in tension thus providing an additional downward force upon the screw 110 which is sufficient to lift the upper stylus 17 and press it against the bottom side of the record to be played with the proper amount of force for effecting the reproduction of the recording thereon. It will also be noted that a slight clockwise rotation of the lever 112 will release the lever 114 allowing it to return to the position shown.

The rotation of the levers 112 and 114 is accomplished by applying a force to their projecting legs 119 and 120, respectively, and such force may be applied by means of a rotatable disc 121 having a projecting pin 122 mounted therein, as shown in FIG. 18 to which reference is now made. The disc 121 is fixedly mounted upon a rotatable shaft 123 and the pin 122 is arranged for cooperation with the projecting legs 119 and 120 so that when the shaft 123 is rotated in one direction, the pin 122 contacts the leg 120 and rotates the lever 114 and when the shaft is rotated in the opposite direction (rotation in either direction being slightly over one-half revolution), the pin contacts the leg 119 and rotates the lever 112. A gear 124 is mounted on the lower end of the shaft 123 and a rack (not shown) cooperates with said gear so as to effect rotation of said shaft at the proper time.

It will be understood that the tone arm 16 should be mounted at a height approximately half-way between the upper record holders 13 and the lower record holders 15 so that said tone arm need be tilted only slightly from the horizontal in order to cooperate with the bottom side of a record supported upon the holders 13 or the top side of a record being supported by the holders 15. The tone arm must, of course, be rotatable about a vertical axis and the vertical shaft 125 (see FIG. 17) upon which it is mounted is rotatably supported (upon a thrust bearing not shown) and is rotated at the proper time by mechanism (not shown) contained within the housing 26.

When a recording has been reproduced, the tone arm 16 should be removed therefrom and brought to an approximately horizontal position. Referring again to FIG. 17, a rod 126 is mounted within the main shaft 125 for vertical movement therein, said rod being actuated by an actuator 127. At the completion of the reproduction of a recording, the actuator 127 exerts an upward force upon the rod 126. A pair of contacts 128 and 129 are both mounted upon the upper end of the rod 126 so as to be an integral part thereof. The contacts 128 and 129 (which are at the same height) are arranged for cooperation with a screw 130 and a screw 131, respectively, said screws being mounted upon the tone arm 16. It will thus be seen that regardless of the position of the tone arm 16, said tone arm will be placed in an approximately horizontal position when the rod 126 is moved upwards, and the styli 17 and 18 will thus be moved clear of the records.

As stated above, the present embodiment of my record supporting and changing spindle is adapted for use in phonographs of the type which play both sides of a plurality of records. When the bottom side of a record 11 is being played it is supported on the upper spindle 10′ by the upper record holders 13, and when the top side of a record is being played it is supported on the lower spindle 10″ by the lower record holders 15. Thus it is necessary that means be provided for rotating the upper spindle and the lower spindle in opposite directions. One mechanism particularly satisfactory for this purpose will now be described in a general way, but here again there are various mechanisms known to the art which would serve this purpose and thus a detailed description is not deemed necessary.

Figure 13:
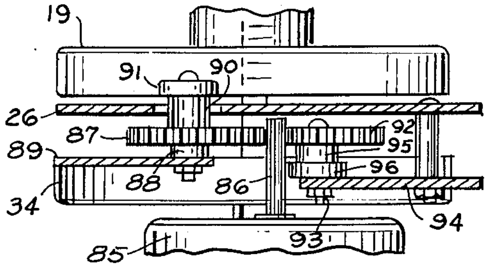
FIG. 13 is a reduced side elevational view, partly in section, illustrating generally a mechanism for rotating the upper and lower spindles in opposite directions.

Referring to FIG. 13 which illustrates one such mechanism, a motor 85 serves to drive a power shaft 86. A wheel 87 is fixedly supported on a shaft 88 which is rotatably mounted in a mounting plate 89. The wheel 87 has integral therewith a shaft 90 which projects upwardly and has a turntable drive roller 91 fixedly mounted thereon. It will be seen that the shaft 90 projects through a suitable aperture in the housing 26 in such manner that the drive roller 91 is positioned above said housing so as to contact the outer peripheral surface of the turntable 19.

In a similar manner a wheel 92 is fixedly supported by a shaft 93 which is rotatably mounted in a mounting plate 94. The wheel 92 has integral therewith a shaft 95 which projects downwardly and has a flywheel drive roller 96 fixedly mounted thereon. The drive shaft 86 is positioned so as to engage and drive the wheel 87 and thus the roller 91 in one direction, and said roller 91 in turn rotates the turntable 19 through its contact with the outer peripheral surface thereof. The drive shaft 86 is not in contact with the wheel 92 but rather said wheel 87 engages and drives the wheel 92 and thus the roller 96 in the opposite direction. The roller 96 in turn engages and rotates the flywheel 34 in said opposite direction through its contact with the outer peripheral surface theerof. In this manner the turntable 19 and the lower spindle 10″ are driven in one direction, and the flywheel 34 and the upper spindle 10′ are driven in the opposite direction. I have thus described the driving mechanism only in a general way in order to provide an illustration of one of many mechanisms which can be used for this purpose.

Referring again to the record holders 13 and 15 and the record separators 14, it was previously noted that said elements are actuated to their operative and inoperative positions by axial movement of the operating shaft 40 which carries the operating head 57 fixedly mounted thereon. An actuator 97 (see FIG. 2) is provided for effecting such axial movement of the operating shaft 40. A thrust bearing 98 is mounted on the shaft 40 at the lower end thereof and is retained on said shaft by a lock nut 99. One end of the actuator 97 consists of a pair of arms 100 (shown best in FIG. 9) which straddle the shaft 40 and rest upon the top of the thrust bearing 98. The other end of the actuator 97 has a cam follower 101 rotatably mounted thereon by means of a pin 102. Said actuator 97 is pivotally mounted near its center by means of a bracket 103 and pin 104.

It will now be understood that if an upward force of sufficient magnitude is exerted upon the cam follower 101 so as to pivot the actuator 97 then the arms 100 of said actuator will exert a downward force upon the thrust bearing 98 and thus move the operating shaft 40 in a downward direction to the position shown in FIG. 8. Furthermore, when such upward force on the cam follower 101 is removed the operating shaft 40 will be returned to its normal upward position (as shown in FIGS. 2 and 9) by the conical compression spring 83.

Figure 16:
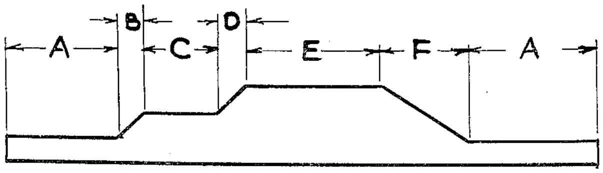
FIG. 16 is a linear schematic representation of a circular cam which serves to actuate the operating shaft of my spindle.

A circular cam 105 is mounted beneath the cam follower 101 upon a shaft 106 by means of a set screw 107. A linear schematic representation of the circular cam 105 is shown in FIG. 16 to which reference is now made.

Figure 14:
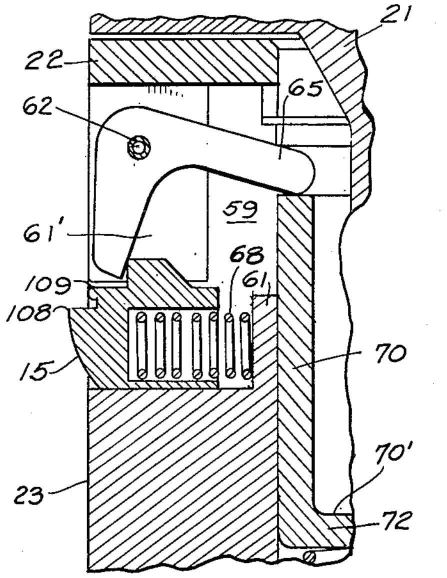
FIG. 14 is an enlarged side elevational view of the spindle, partly broken away, illustrating the position of the lower record supports at the time a record is being received thereon.

When the spindle 10 is not in operation the position of the cam 105 is such that the cam follower 101 will rest upon the cam surface A and the operating shaft 40 will be held in its upward position by the spring 83. The cam 105 will remain in this position during the reproduction of the bottom side of a recording which is supported upon the upper record holders 13. After said reproduction has been completed the cam 105 will be rotated so that the cam follower 101 will ride up the cam slope B and move along the cam surface C. The upward movement of the cam follower 101 to the surface C effects a downward movement of the operating shaft 40 sufficient to retract the upper record holders 13 inwardly and project the record separators 14 outwardly, so as to drop the lowermost record from the stack of records which rested upon said holders 13. The downward movement of the shaft 40 also causes the lower record holders 15 to be projected outwardly to the position shown in FIG. 14. It will be noted that in this position the outer edges 108 of the holders 15 project outwardly beyond the outer peripheral surface of the lower spindle bottom 23, but the projections 109 on said members 15 which form the upper portions of the grooves 69 do not so project. Thus the record which has been dropped will be received by the edges 108 and supported thereby. The surface C on the cam 105 provides sufficient dwell time for said record to come to rest in said supported position.

Figure 15:
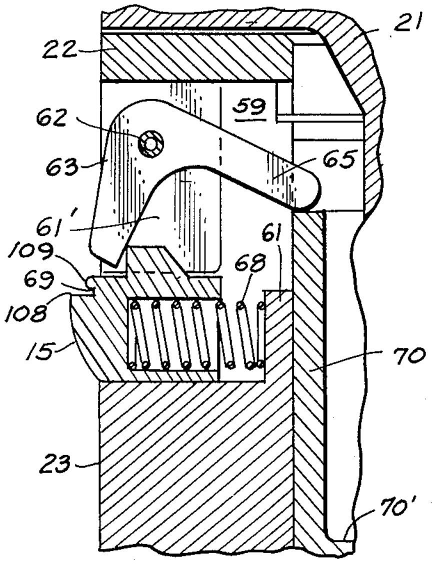
FIG. 15 is an enlarged side elevational view of the spindle, partly broken away, illustrating the position of said lower record supports when a record is being gripped thereby for reproduction of its top side.

The cam 105, which is still being rotated, will then move the follower 101 up the slope D to the cam surface E and the additional downward movement thus imparted to the operating shaft 40 will bring the lower record holders into the position shown in FIG. 15. In this position the lower record holders 15 will grip the record being supported thereby as shown in FIG. 8. The cam 105 will then have made one-half of a revolution and will come to rest with the follower 101 supported upon the cam surface E, while the top side of the record supported by the lower record holders 15 is reproduced. After this reproduction is completed the cam 105 will be rotated another one-half revolution so as to bring the follower 101 back to rest upon the surface A thus permitting the operating shaft 40 to be returned to its upward position by the spring 83. Such upward movement of the shaft 40 causes the upper record holders 13 to be pivoted inwardly and the record separators 14 to be pivoted outwardly so as to permit the stack of records to be played to be dropped the slight distance from said separators 14 to said holders 13, and also causes the lower record holders 15 to be retracted inwardly so as to drop that record which has had its top side reproduced to the turntable 19. The cycle described above is repeated until the recordings on both sides of all of the records have been reproduced.

While in the embodiment being described the circular cam 105 is rotated only one-half revolution after each reproduction of a recording, it will be understood that if the automatic photograph being used were adapted to play only the top side of a record then the cam 105, which is in the E position during the reproduction of a top side of a record, would be rotated one full revolution after each reproduction so as to release the record from the lower record holders 15 and cause the next record to be mounted thereon.

It will also be understood that by adjusting the cycle of the cam 105 and varying the tone arm movement during the change cycle, the spindle of this invention can be used to play both sides of a record while it remains in a single playing position. Thus, referring to FIG. 1, the top side of the record supported by the lower record holders 15 could be reproduced after which the tone arm could be pivoted clear of the record and disposed beneath said record to reproduce the underside thereof. In this instance the circular cam 105 would be rotated one full revolution after the reproduction of both sides of the record supported by said holders 15 so as to release the record which had been played and place the next record in said single playing position. Of course, with such an arrangement the direction of rotation of the lower spindle would have to be reversed at the completion of the reproduction of each side of the record.

Referring again to the present embodiment the circular cam 105 is rotated the one-half revolution after each reproduction by gear means (not shown) driven by the motor 85. Because gear means suitable for this purpose are well-known and not a part of the present invention, it is not thought that any detailed description herein is necessary.

*Operation*

While the spindle 10 is idle and the supporting elements are in the position shown in FIGS. 2 and 9, a stack of records to be played is mounted on said spindle so as to be supported by the upper record holders 13. The phonograph embodying said spindle is then set into operation and the upper spindle 10' and the lower spindle 10'' are rotated in opposite directions.

The tone arm 16 is next brought into playing position with the bottom side of the lowermost record in the stack which is reproduced. The the tone arm is moved clear of the records and the cam 105 is rotated one-half of a revolution so that the lowermost record in the stack is dropped to the lower record holders 15 and gripped thereby, while the remainder of the stack is supported by the record separators 14. The tone arm 16 is next brought into playing position with the top side of the record which was dropped and that side is reproduced.

After said reproduction is completed the tone arm is again moved clear of the records and the cam 105 is again rotated one-half of a revolution so as to drop the record which has just been played to the turntable 19, and drop the remaining stack of records to the upper record holders 13. At this time one record will have had both sides reproduced and the supporting elements will again be in their initial positions as shown in FIGS. 2 and 9. The above cycle is repeated until all records have been played, at which time the records may be removed manually from the turntable 19 or, as previously described, they may be automatically lifted on the spindle 10 so as to rest upon the upper record holders 13 for the next playing cycle.

It will readily be seen that I have accomplished objects of my invention since with the spindle described herein there are but two record playing positions, one for the reproduction of each side of a record, and each of said positions is arranged so that a tone arm mounted at a height between said positions need not be tilted appreciably from the horizontal to reproduce any recording.

Furthermore, the number of records which can be accommodated automatically by my spindle is limited only by the lengths of the upper spindle top 20 and the lower spindle bottom 23, which may be made as long as is desired. Also no records are played while resting upon the turntable 19, but rather when the top side of a record is being reproduced it is positively gripped by the lower record holders 15.

This invention can, of course, be applied in various ways and the present description should, therefore, be regarded as disclosing only an illustrative embodiment of the invention from which no unnecessary limitations should be implied.

I claim:

1. Apparatus for use in automatic phonographs of the type adapted to play both sides of a plurality of records, comprising: a vertical rotatable member having a diameter slightly less than that of the central apertures in the records to be played so as to permit sliding of said records thereon, said rotatable member having an upper section and a lower section which are mounted independently for rotation in opposite directions; driving means for rotating said upper section in one direction and said lower section in the opposite direction; upper record supporting means mounted in said upper section for supporting a stack of records in such a manner that the bottom side of the lowermost record in said stack can be reproduced by said phonograph, said upper record supporting means being actuable so as to release the lowermost record in said stack while supporting the remainder thereof; lower record supporting means mounted in the lower section of said rotatable member for receiving a record which has been released by said upper record supporting means and for supporting such a record in downwardly spaced relation to said upper record supporting means in such a manner that the top side of such a record can be reproduced by said phonograph, said lower record supporting means being actuable so as to release a record supported thereby; a tone arm having an upper and a lower stylus on one free end and having its other end mounted at a fixed height approximately equidistant vertically between said upper and said lower record supporting means; means for raising the free end of said tone arm into a first operative playing position so as to reproduce the bottom side of the lowermost record in said stack; means for actuating said upper record supporting means so as to release the lowermost record from said stack after reproduction of the bottom side thereof; means for lowering the free end of said tone arm into a second operative playing position so as to reproduce the top side of a record supported on said lower record supporting means; means for actuating said lower record supporting means so as to release the record supported thereby after reproduction of the top side thereof and prior to the receipt of the next record thereon; and retaining means positioned beneath said lower record supporting means for receiving all records which have been released by said lower record supporting means.

2. Apparatus for use in automatic phonographs of the type adapted to play both sides of a plurality of records, comprising: a vertical rotatable member having a diameter slightly less than that of the central apertures in the records to be played so as to permit sliding of said records thereon, said rotatable member having an upper section and a lower section which are mounted independently for rotation in opposite directions; driving means for rotating said upper section in one direction and said lower section in the opposite direction; upper record supporting means mounted in the upper section of said rotatable member for movement between operative positions wherein said means will support a stack of records in such a manner that the bottom side of the lowermost record in said stack can be reproduced by said phonograph, and inoperative positions wherein said means will release the records mounted thereon; a plurality of record separating elements mounted in the upper section of said rotatable member immediately above said upper record supporting means for common movement between operative positions wherein said separating elements are interjected between the lowermost and the next-to-lowermost record in said stack so as to support all but the lowermost record thereof, and inoperative positions wherein said separating elements will release the records mounted thereon; lower record supporting means mounted in the lower section of said rotatable member in downwardly spaced relation to said upper record supporting means for movement between operative positions wherein said means will receive a record which has been released by said upper record supporting means and support said record in such a manner that the top side of such a record can be reproduced by said phonograph, and inoperative positions wherein said lower record supporting means will release a record mounted thereon; a tone arm having an upper and a lower stylus on one free end and having its other end mounted at a fixed height approximately equidistant vertically between said upper and lower record supporting means; means for bringing the free end of said tone arm into two operative playing positions, one for reproducing the bottom side of the lowermost record in said stack and the other for reproducing the top side of a record supported on said lower record supporting means; retaining means positioned beneath said lower record supporting means for receiving all records which have been released by said lower record supporting means; and an operating element mounted in said rotatable member for movement in a first direction to bring said upper record supporting means to their operative positions and said record separating elements and lower record supporting means to their inoperative positions, and for movement in the opposite direction to bring said upper record supporting means to their inoperative positions and said record separating elements and lower record supplying means to their operative positions.

3. Apparatus of the type set forth in claim 17 wherein said operating element comprises a shaft slidably mounted for vertical movement within said rotatable member and operatively connected to said upper and lower record supporting means and said record separating elements, and wherein means are provided for moving said shaft vertically in said first direction after each reproduction of the top side of a record and for moving said shaft vertically in said opposite direction after each reproduction of a bottom side of a record.

References Cited in the file of this patent

UNITED STATES PATENTS

| | | |
|---|---|---|
| 2,643,127 | Gregg et al. | June 23, 1953 |
| 2,837,338 | Andres | June 3, 1958 |
| 2,873,977 | Manning | Feb. 17, 1959 |
| 2,919,924 | Wilton | Jan. 5, 1960 |

FOREIGN PATENTS

| | | |
|---|---|---|
| 1,034,383 | Germany | July 17, 1958 |
| 1,161,173 | France | Aug. 22, 1958 |

UNITED STATES PATENT OFFICE

CERTIFICATE OF CORRECTION

Patent No. 3,020,050 February 6, 1962

Victor Jorner

It is hereby certified that error appears in the above numbered patent requiring correction and that the said Letters Patent should read as corrected below.

Column 16, line 36, for the claim reference numeral "17" read -- 2 --.

Signed and sealed this 5th day of June 1962.

(SEAL)
Attest:

ERNEST W. SWIDER
Attesting Officer

DAVID L. LADD
Commissioner of Patents